(12) United States Patent
Zhang et al.

(10) Patent No.: US 12,326,738 B2
(45) Date of Patent: Jun. 10, 2025

(54) METHOD FOR CONTROLLING MOTIONS OF QUADRUPED ROBOT BASED ON REINFORCEMENT LEARNING AND POSITION INCREMENT

(71) Applicant: SHANDONG UNIVERSITY, Shandong (CN)

(72) Inventors: Wei Zhang, Jinan (CN); Jiapeng Sheng, Jinan (CN); Yanyun Chen, Jinan (CN); Xing Fang, Jinan (CN); Wenhao Tan, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/266,694

(22) PCT Filed: Oct. 18, 2022

(86) PCT No.: PCT/CN2022/125983
§ 371 (c)(1),
(2) Date: Jun. 12, 2023

(87) PCT Pub. No.: WO2023/159978
PCT Pub. Date: Aug. 31, 2023

(65) Prior Publication Data
US 2025/0021109 A1    Jan. 16, 2025

(30) Foreign Application Priority Data
Feb. 28, 2022 (CN) .......................... 202210191785.X

(51) Int. Cl.
*G05D 1/646* (2024.01)
*B62D 57/032* (2006.01)
(52) U.S. Cl.
CPC ........... *G05D 1/646* (2024.01); *B62D 57/032* (2013.01)

(58) Field of Classification Search
CPC .............................. G05D 1/646; B62D 57/032
See application file for complete search history.

(56) References Cited

U.S. PATENT DOCUMENTS 9,050,724 B2 * 6/2015 Takagi ................... B25J 9/1633
10,059,392 B1 * 8/2018 Fay ............................ B25J 9/16
(Continued)

FOREIGN PATENT DOCUMENTS

CN        107562052 A       1/2018
CN        110893118 A       3/2020
(Continued)

OTHER PUBLICATIONS

Machine Translation of CN 107562052 retrieved from Espacenet on Dec. 13, 2024 (Year: 2024).*
(Continued)

*Primary Examiner* — Thomas Ingram
(74) *Attorney, Agent, or Firm* — Oliff PLC

(57) ABSTRACT

A method for controlling motions of a quadruped robot based on reinforcement learning and position increment, including: acquiring motion environment information, quadruped robot attitude information, and foot sole position information; based on the acquired information, generating foot sole positions of the quadruped robot during motions within all preset time steps, and calculating a change of the foot sole positions in all the time steps; taking a maximum moving distance within a single time step as a constraint, and accumulating the time steps at the same time to obtain a foot sole position trajectory; and controlling the quadruped robot to perform corresponding actions based on the foot sole position track combined with a preset reward function, so as to keep motion balance of the quadruped robot.

6 Claims, 3 Drawing Sheets

(56) References Cited

U.S. PATENT DOCUMENTS

| | | | | |
|---|---|---|---|---|
| 2012/0072026 | A1* | 3/2012 | Takagi | B25J 9/1633 |
| | | | | 901/1 |
| 2021/0107150 | A1* | 4/2021 | Whitman | B62D 57/032 |
| 2022/0241980 | A1* | 8/2022 | Bollini | B25J 9/1664 |
| 2024/0189989 | A1* | 6/2024 | Di Carlo | B25J 9/1664 |
| 2024/0412726 | A1* | 12/2024 | Delmas | G10L 15/22 |

FOREIGN PATENT DOCUMENTS

| | | |
|---|---|---|
| CN | 112060082 A | 12/2020 |
| CN | 112596534 A | 4/2021 |
| CN | 113821045 A | 12/2021 |
| CN | 114563954 A | 5/2022 |

OTHER PUBLICATIONS

Machine Translation of CN 112596534 retrieved from Espacenet on Dec. 13, 2024 (Year: 2024).*
V. Tsounis, M. Alge, J. Lee, F. Farshidian and M. Hutter, "DeepGait: Planning and Control of Quadrupedal Gaits Using Deep Reinforcement Learning," in IEEE Robotics and Automation Letters, vol. 5, No. 2, pp. 3699-3706, Apr. 2020 (Year: 2020).*
Aractingi, M., LÃ © ziart, PA., Flayols, T et al. Controlling the Solo12 quadruped robot with deep reinforcement learning. Sci Rep 13, 11945 (2023). https://doi.org/10.1038/s41598-023-38259-7 (Year: 2023).*
Dec. 27, 2022 Search Report issued in International Patent Application No. PCT/CN2022/125983.
Dec. 28, 2022 Written Opinion of the International Searching Authority issued in International Patent Application No. PCT/CN2022/125983.

* cited by examiner

METHOD FOR CONTROLLING MOTIONS OF QUADRUPED ROBOT BASED ON REINFORCEMENT LEARNING AND POSITION INCREMENT

CROSS-REFERENCE TO RELATED APPLICATIONS

The present disclosure claims priority to Chinese Patent Application No. 202210191785.X, entitled "METHOD FOR CONTROLLING MOTIONS OF QUADRUPED ROBOT BASED ON REINFORCEMENT LEARNING AND POSITION INCREMENT" and filed with the China National Intellectual Property Administration on Feb. 28, 2022, which is incorporated herein by reference in its entirety.

TECHNICAL FIELD

The present disclosure relates to the field of control of quadruped robots, and in particular to a method for controlling motions of a quadruped robot based on reinforcement learning and position increment.

BACKGROUND

Quadruped robots have been widely applied to the scenarios of monitoring and patrolling, environment reconnaissance, transportation and supply, etc. In another aspect, dynamic characteristics of the quadruped robots become more complicated due to their flexibility and adaptability, which brings a great challenge to implement animal-like motions of the quadruped robots. However, specific functions of various mobile robots can only be achieved based on and on the premise of flexible and efficient motion control.

The motions of the quadruped robots are mainly controlled by two main categories of methods: a model-based method and a reinforcement learning-based method.

(1) Conventional Modeling Control Method

The conventional modeling control method includes the steps of extracting features according to state information of a robot and acquiring valuable information, and then calculating a motor control command by a controller. The method mainly has two technical problems: Firstly, an accurate model for a controlled object needs to be created, but it is very difficult to create an accurate mathematical model for the quadruped robot because it is a higher-order non-linear complex system. Secondly, a non-linear controller is difficult to design and solve and has many constraint conditions, and it is also required to perform explicit state estimation and set a threshold value based on experiences to trigger a finite-state machine for coordinating a motion controller.

(2) Control Method Based on Deep Reinforcement Learning

The control method based on deep reinforcement learning can automatically design a control policy for robots in various complex environments by means of environment interaction, without the need of the accurate model, which greatly reduces the labor burden of human beings and achieves good control results. At present, this method mainly involves in two orientations: a pure reinforcement learning method and a reinforcement learning method combined with conventional control. Since the quadruped robot is of a dynamic stable equilibrium system with many degrees of freedom, it is difficult for reward design and training for motion control of the quadruped robot based on pure reinforcement learning. Moreover, compared with quadrupeds in nature, it is very prone to have uncoordinated and unnatural gaits. An effective solution is to directly combine a conventional control method, create a hierarchical control framework, control a lower-level conventional controller by taking reinforcement learning as an upper-level policy, and output a motor control instruction by the conventional controller to implement stable walking of the quadruped robot. This method reduces the difficulty level of reinforcement learning to a certain extent, but has insufficient environmental adaptability because the control performance of reinforcement learning is limited by the lower-level conventional controller. This may replace the complex lower-level controller by introducing a periodic oscillator, directly output parameters of the periodic oscillator and residual errors of foot sole positions by the reinforcement learning, and finally synthesize the motor control instruction. However, a motor position directly generated by a neural network will change greatly and suddenly due to the nonlinearity of the neural network, and a motor can track a target position only after outputting a great torque, which easily leads to physical damages to the motor. Although this problem can be relieved by introducing a constraint reward function of an output torque or velocity of the motor, this also increases the difficulty level of designing the reward function and adjusting parameters to a great extent, so that the reinforcement learning-based method cannot obtain a motion control policy with good performance.

SUMMARY

The objective of the present disclosure is to overcome the shortcomings in the prior art by providing a method and system for controlling motions of a quadruped robot based on reinforcement learning and position increment, which avoid sudden changes of control commands by restraining a change of foot sole positions of the quadruped robot within each time step, can obtain an even and smooth foot sole trajectory without the need of evenness and motor velocity rewards, and enhance the ability of the quadruped robot to pass through complex terrains in flexible, stable, and smooth gaits.

A first objective of the present disclosure is to provide a method for controlling motions of a quadruped robot based on reinforcement learning and position increment, the method including:

acquiring motion environment information, quadruped robot attitude information, and foot sole position information;

based on the acquired information, generating foot sole positions of the quadruped robot during motions within all preset time steps, and calculating a change of the foot sole positions in all the time steps;

taking a maximum moving distance within a single time step as a constraint, and accumulating the time steps at the same time to obtain a foot sole position trajectory; and controlling the quadruped robot to perform corresponding actions based on the foot sole position trajectory combined with a preset reward function, so as to keep motion balance of the quadruped robot.

Further, the quadruped robot is provided with an inertial measurement unit and a joint motor encoder to acquire a reference linear velocity, a direction, an angular velocity, and a joint position of the quadruped robot.

Further, joint state historical information and leg phase information of the quadruped robot are acquired, and serve as a control input of the quadruped robot after being processed, so as to obtain a next action command to control the motions of the robot.

Further, ground contact detection is implemented through the joint state historical information which includes a joint position error and a joint velocity, where the joint position error is a deviation between a current joint position and a previous joint position instruction.

Further, a foot sole position region is selected based on a reinforcement learning policy and this region serves as a change interval of foot sole positions so as to restrain the maximum moving distance of foot soles within a single time step.

Further, a foot sole position of each leg of the quadruped robot in the Z-axis direction is outputted by using an independent trajectory generator; and a foot sole position increment and an adjusting frequency of each leg are outputted based on the reinforcement learning policy, the foot sole position increments in the X-axis and Y-axis directions are accumulated to obtain foot sole positions in the X-axis and Y-axis directions, and the foot sole position increment in the Z-axis direction and a priori value are superposed to obtain a foot sole position in the Z-axis direction.

Further, target foot sole positions are predefined in a basic framework of the quadruped robot and are combined with corresponding target positions to calculate target joint motor positions, and joint torques are calculated to track the target joint motor positions.

Further, a base linear velocity reward function and a rotation direction reward function of the quadruped robot are designed to encourage the robot to track an upper-level control instruction to give specified velocity instruction and rotation direction instruction.

Further, an angular velocity reward function, a lateral coordination reward function, a sagittal coordination reward function, a stride reward function, a foot sole sideslipping reward function, and a foot sole raising reward function are designed, respectively, and these reward functions work together to guide the quadruped robot to complete action execution.

A second objective of the present disclosure is to provide a system for controlling motions of a quadruped robot based on reinforcement learning and position increment, adopting the following technical solution:

including:
an information acquisition module, configured to: acquire motion environment information, quadruped robot attitude information, and foot sole position information;
an increment calculation module, configured to: based on the acquired information, generate foot sole positions of the quadruped robot during motions within all preset time steps, and calculate a change of the foot sole positions in all the time steps;
a trajectory planning module, configured to: take a maximum moving distance within a single time step as a constraint, and accumulate the time steps at the same time to obtain a foot sole position trajectory; and
a motion control module, configured to: control the quadruped robot to perform corresponding actions based on the foot sole position trajectory combined with a preset reward function, so as to keep motion balance of the quadruped robot.

Compared with the prior art, the present disclosure has the following advantages and positive effects:

(1) With respect to the problem that a motor position generated in an existing method for controlling motions of a quadruped robot has a great sudden change and motor damages are caused, sudden changes of control commands are avoided by restraining the change of the foot sole positions of the quadruped robot within each time step, an even and smooth foot sole trajectory can be obtained without the need of evenness and motor velocity rewards, and the ability of the quadruped robot to pass through complex terrains in flexible, stable, and smooth gaits is enhanced.

(2) The quadruped robot learns the change of the foot sole positions of the quadruped robot within each time step to avoid the sudden changes of control commands. The method can obtain the even and smooth foot sole trajectory without the need of evenness and motor velocity rewards, and empowers the reinforcement learning policy with a great adjusting ability and enhances the ability of the quadruped robot to pass through the complex terrains in flexible, stable, and smooth gaits in a case of reducing the learning difficulty.

(3) While the learning-based method is retained to reduce difficulties of manual design of the control policy and labor burdens of human beings, permanent physical damages to motors, caused by the sudden changes of control commands outputted by a neural network, are avoided by learning the change of the foot sole positions in a single time step.

(4) Compared with an existing end-to-end method for controlling a robot based on reinforcement learning, this method avoids additional reward designs for motor torques and velocity constraints, reduces the learning difficulty of the control policy, and improves the performance of the control policy.

BRIEF DESCRIPTION OF THE DRAWINGS

The accompanying drawings constituting a part of the present disclosure are used to provide a further understanding of the present disclosure. The exemplary embodiments of the present disclosure and descriptions thereof are used to explain the present disclosure, and do not constitute an improper limitation of the present disclosure.

DETAILED DESCRIPTION

Embodiment 1

In one typical embodiment of the present disclosure, as shown in FIG. 1 to FIG. 4, a method for controlling motions of a quadruped robot based on reinforcement learning and position increment is set forth.

Figure 1:
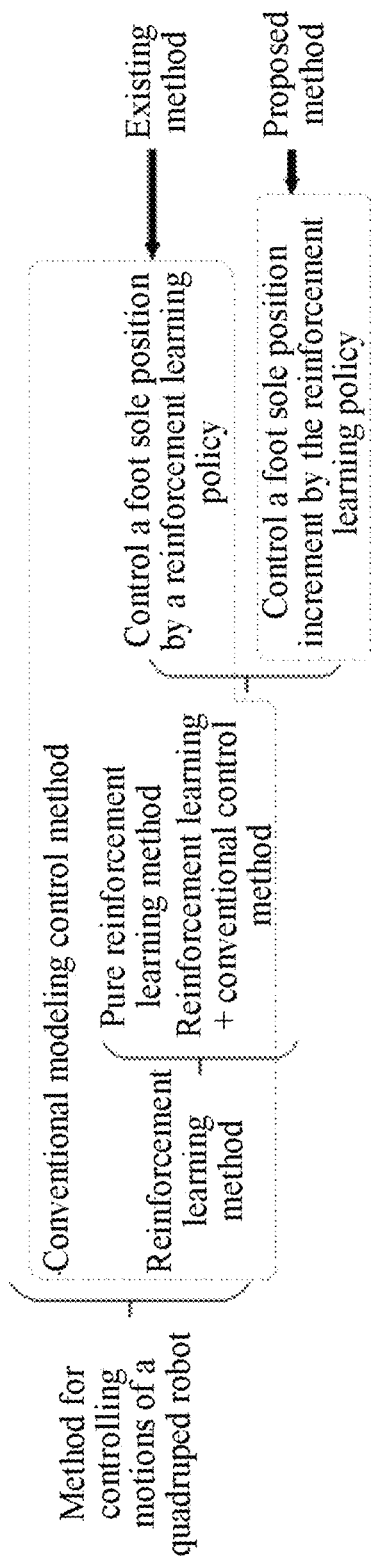
FIG. 1 is a schematic diagram of comparison between a method for controlling motions in Embodiment 1 or 2 of the present disclosure and an existing method.

As shown in FIG. 1, different from an existing method for controlling gaits of a quadruped robot, this embodiment sets forth the method for controlling motions of a quadruped robot based on reinforcement learning and position increment, which allows the quadruped robot to learn a change of foot sole positions in each time step to avoid sudden changes of control commands, enabling the quadruped robot to learn smooth and coordinated motions in an RL framework and reducing the difficulty level of adjusting hyper-parameters in a training stage. The reinforcement learning can be performed on the premise of interaction with environments, and it is possible to cause irreversible destructions and damages to the robot due to the trial-and-error learning and randomness of a policy in an early stage of training and make it impossible to train in a real environment. Therefore, this solution implements autonomous motions of the quadruped robot by means of training in a simulation environment and then migrating to the real environment.

Figure 2:
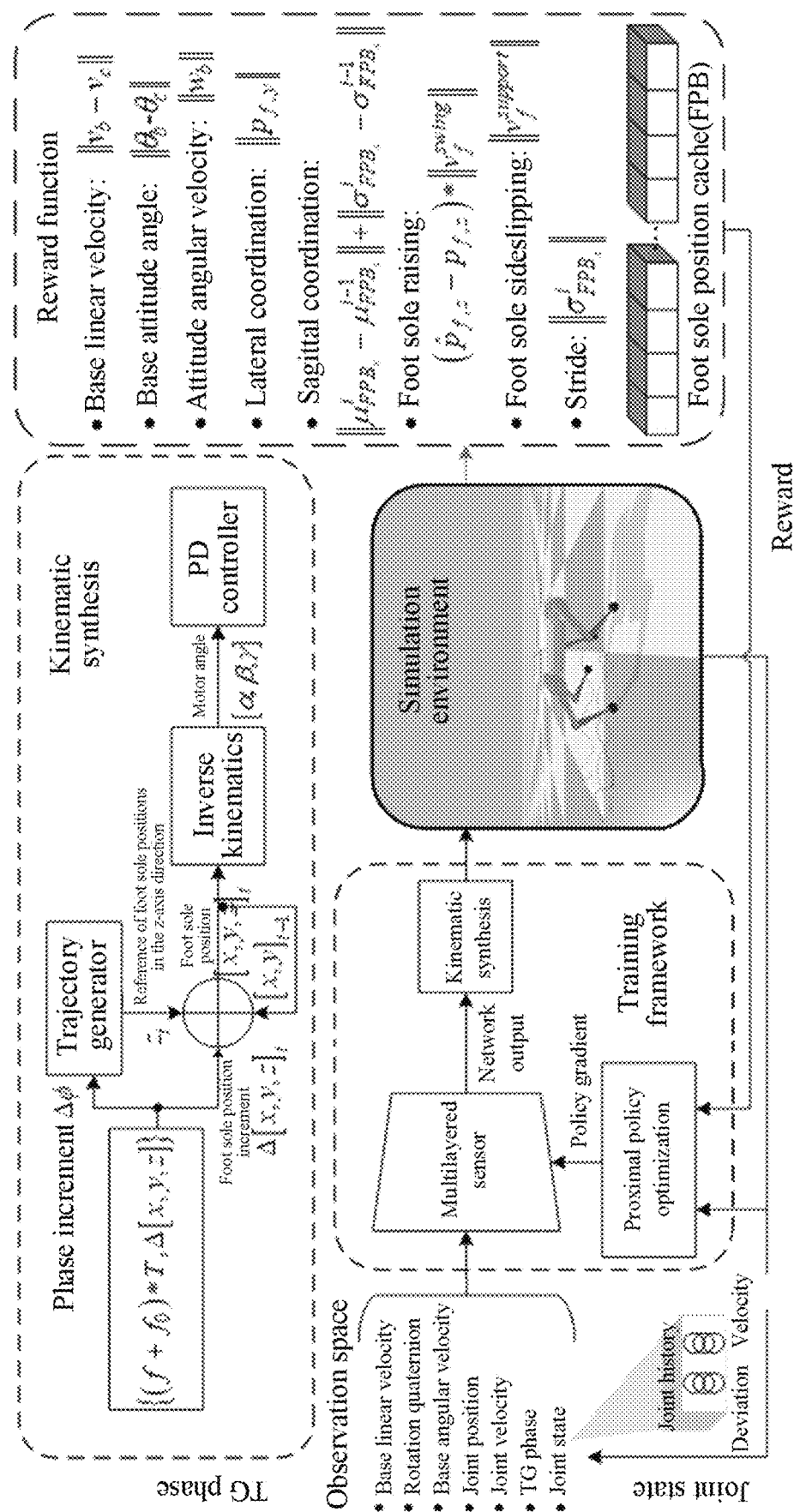
FIG. 2 is a schematic diagram of a motion control training framework of a quadruped robot in Embodiment 1 or 2 of the present disclosure.

As shown in FIG. 2, the method for controlling motions of a quadruped robot based on reinforcement learning and position increment mainly includes:

acquiring motion environment information, quadruped robot attitude information, and foot sole position information;

based on the acquired information, generating foot sole positions of the quadruped robot during motions within all preset time steps, and calculating a change of the foot sole positions in all the time steps;

taking a maximum moving distance within a single time step as a constraint, and accumulating the time steps at the same time to obtain a foot sole position trajectory; and controlling the quadruped robot to perform corresponding actions based on the foot sole position trajectory combined with a preset reward function, so as to keep motion balance of the quadruped robot.

Specifically, considering the motions of the quadruped robot as a partially observable Markovian decision process (POMDP) <S,A,R,P,γ>, where S and A represent a state and an action space, respectively. $R(s_t, s_{t+1}) \rightarrow R$ is a reward function, $P(s_{t+1}|s_t, a_t)$ is a transition probability, and $\gamma \in (0,1)$ is a reward discount factor. The quadruped robot takes an action a in the current state to obtain a scalar reward r, and then moves the next state s; and $P(s_{t+1}|s_t, a_t)$ is determined by the distribution of state transition probabilities. An overall objective of training the quadruped robot is to find an optimal policy $\pi_\theta^*$ for maximizing further discount rewards, that is:

$$\theta^* = \arg\max_\theta E\left[\sum_{T-1}^{t=0} \gamma^t R(s_t, s_{t+1})\right] \quad (1)$$

A gait training framework of the quadruped robot shown in FIG. 2 is combined, and mainly includes three parts of observation space design, action space design, and reward function design. The reinforcement learning guides the robot to continuously explore in a physical simulation environment by utilizing the designed reward function so as to adapt to the complex environment and finally obtain a robust motion controller by learning. An RL policy is optimized by adopting a proximal policy optimization (PPO) algorithm and a set reward function, where an input is simply preprocessed sensor data and an output is an incremental foot sole position proposed by this solution, and both are finally converted into a motor position control instruction. Furthermore, the quadruped robot may also track upper-level user instructions, including a forward velocity $\hat{v}_x$ and a yaw angle $\hat{\theta}_z$ of a base. A velocity instruction vector $v_c$ and a rotation direction instruction vector $\theta_c$ are defined as $<\hat{v}_x, 0, 0>$ and $<0, 0, \hat{\theta}_z>$, respectively. In the training stage, the quadruped robot is encouraged to follow an upper-level user command, keep balanced, and complete coordinated motions.

Observation Space Design

In this embodiment, the quadruped robot only contains the most basic proprioceptive sensor, which includes an inertial measurement unit (IMU) and 12 motor encoders and can obtain a reference linear velocity $v_b \in R^3$, a direction $\theta_b \in R^3$ or a quaternion form $q_b=[x,y,z,w] \in R^4$ thereof, an angular velocity $w_b \in R^3$ and a joint position $\theta_j \in R^{12}$ of a robot body by measurement. A joint velocity $\dot{\theta}_j \in R^{12}$ may be obtained through an extended Kalman filter. Since a foot sole pressure sensor is lacked, this solution introduces a joint state history Θ as a network input to implement ground contact detection, and Θ includes a joint position error, a joint velocity, etc. The joint position error is defined as a deviation between a current joint position and a previous joint position instruction. Furthermore, a leg phase ϕ also serves as a network input and is uniquely represented by $<\sin(\phi),\cos(\phi)>$. Therefore, a state space at the time t is wholly defined as $<v_b, q_b, w_b, \theta_i, \dot{\theta}_j, \Theta, \sin(\phi), \cos(\phi)>$. These states serve as the network inputs after being preprocessed and normalized to further generate an action command of the next moment, which controls the actions of the quadruped robot and circulates continuously.

Action Space Design

Figure 3:
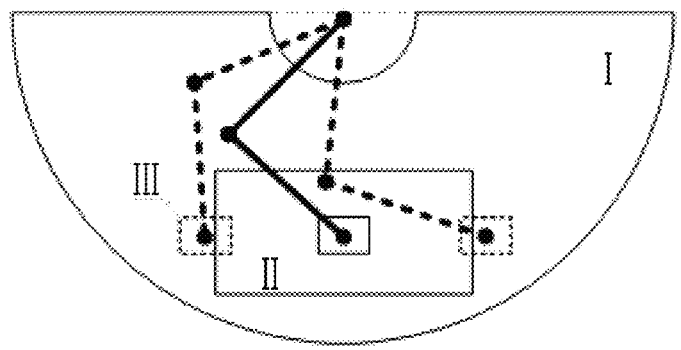
FIG. 3 is a schematic diagram of an incremental gait development and learning mode in Embodiment 1 or 2 of the present disclosure.

At present, a commonly used method for learning gaits of a quadruped robot mainly focuses on directly outputting a motor position or foot sole position command, which may lead to sudden changes of position commands between two relatively short consecutive time steps, make joints generate excessive torques to track a target position, and cause damages to a motor. With respect to this problem, this solution proposes a method for learning gaits based on incremental foot sole positions, which allows the quadruped robot to learn a change of foot sole positions in each time step and avoid sudden changes of the control commands, so as to obtain an even and smooth gait trajectory. The schematic diagram of an incremental gait learning and development mode is as shown in FIG. 3, in which a region II is a foot sole position region selectable for the reinforcement learning policy, and a region III is a change interval of foot sole positions allowable under an incremental gait.

Such new incremental action space explicitly retrains a maximum moving distance of foot soles within a single time step and accumulates the time steps at the same time to obtain an optimal foot sole position trajectory. A foot sole position space will change dynamically along with the movement of the foot sole trajectory until a mechanical limit is reached, such as a region I in FIG. 3. This method allows the reinforcement learning policy to be directly optimized through rewards related to a main task (for example, learning gaits as natural as those of quadrupeds), without the need of considering adverse impacts caused by the fact that sudden changes of a motor state are punished in the reward function, such as a possibly caused motor jitter or static state.

To enable the quadruped robot to learn natural and regular gaits, policies modulating trajectory generators (PMTG) are introduced to assist the training of the quadruped robot.

Each leg uses an independent trajectory generator (TG) to output the foot sole position in the z-axis direction. The TG is defined to simulate a basic stepping gait mode by using cubic Hermite spline, and the equation is as follows:

$$F(\phi) = \begin{cases} h(-2k^3 + 3k^2) & k \in [0, 1] \\ h(2k^3 - 9k^2 + 12k - 4) & k \in [0, 2] \\ 0 & \text{otherwise} \end{cases} \quad (2)$$

In the equation=$2(\phi-\pi)/\pi$, h is a maximum allowable foot raising height, and $\phi \in [0, 2\pi)$ is a TG phase, where $\phi \in [0, \pi)$ is a support phase and $\phi \in [\pi, 2\pi)$ is a swing phase.

By adopting the reinforcement learning policy, a foot sole position increment $\Delta[x, y, z]$ and an adjusting frequency f of each leg are outputted. The phase of the $i^{th}$ leg can be calculated by the equation $\phi_i = (\phi_{i,0} + (f_0 + f_i)*T)(\mod 2\pi)$. In the equation, $\phi_{i,0}$ is an initial phase of the $i^{th}$ leg, $f_0$ is a fundamental frequency, and T is the time between two consecutive control steps. A target foot sole position $(x,y,z)_t$ of the time t can be obtained by the following equation:

$$(x, y, z)_t = \Delta(x, y, z)_t + (x_{t-1}, y_{t-1}, F(\phi_t)) \tag{3}$$

From the above equation, the foot sole positions in the x-axis and y-axis directions may be obtained by accumulating foot sole position increments $(\Delta x, \Delta y)$ outputted by the network, and the foot sole position in the z-axis direction is obtained by superposing the foot sole position increments $\Delta z$ outputted by the network and a priori value provided by the TG. The former makes the target foot sole positions change more smoothly, and the latter can easily obtain regular periodic motions. The target foot sole positions are predefined in the basic framework of the quadruped robot; then corresponding target motor positions are calculated by utilizing inverse kinematics (IK); and finally, joint torques are calculated through a proportional differential (PD) controller to track the target motor positions.

Reward Function Design

The design of reward functions is the key of a whole reinforcement learning framework and also plays two roles. One is ability estimation: human designers use specified reward functions to evaluate behaviors of the quadruped robot. The other is behavior guidance: an RL algorithm uses reward functions to determine the behaviors of the robot. The following will elaborate mathematical forms and design objectives of reward functions designed in this study in details. First of all, the following two kernel functions are introduced to restrain the reward functions, ensuring that reward values are in a reasonable range:

$$G(x) = \frac{1}{e^x + 2 + e^{-x}} \tag{4}$$

$$C(x) = -\frac{1}{e^x + 2 + e^{-x}} + 0.25 \tag{5}$$

A base linear velocity reward function $r_t^v$ and a rotation direction reward function $r_t^o$ of the robot are designed to encourage the robot to track specified velocity instruction $v_c$ and rotation direction instruction $\theta C$. The specific form is follows:

$$r_t^v = G(3 * \|v_b - v_c\| / \|v_c\|) \tag{6}$$

$$r_t^o = G(3 * \|\theta_b - \theta_c\| / \|v_c\|)$$

In the equation, $v_b$ and $\theta_c$ are a base linear velocity and a rotation direction, respectively, and a velocity norm $\|v_c\|$ can scale rewards to an appropriate range.

An angular velocity reward function $r_t^w$ is designed to encourage the robot to keep the base stable and not shaking: $r_t^w = -\|W_b\|$.

Figure 4:
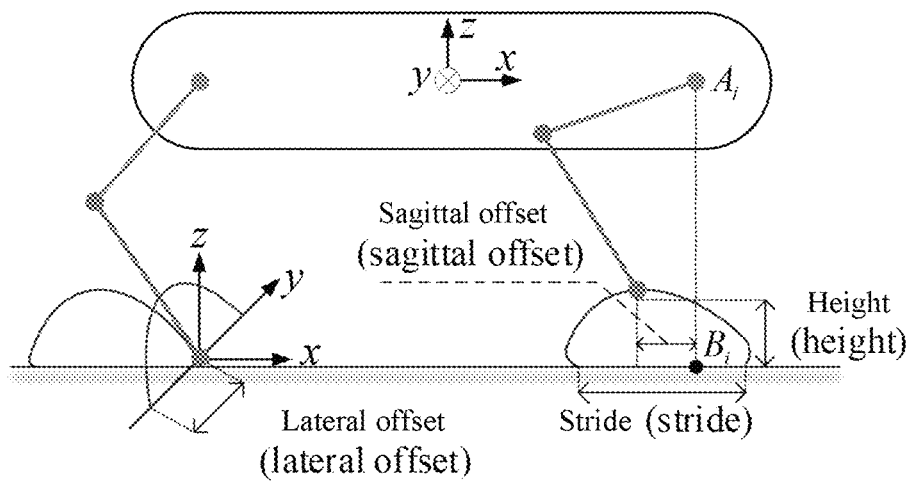
FIG. 4 is a schematic diagram of a reward design in Embodiment 1 or 2 of present disclosure.

A lateral coordination reward function $r_t^{lc}$ is designed to minimize a lateral offset of each leg, as shown in FIG. 4.

$$r_t^{lc} = -\sum_{i=0}^{4} \|p_{f,y}^i\| \tag{7}$$

In the equation, $p_{f,y}^i$ is a component of the foot sole position of the $i^{th}$ leg on the y axis.

A sagittal coordination reward function $r_t^{sc}$ is designed to encourage strides of four legs being the same and reduce a sagittal offset as much as possible, as shown in FIG. 4.

$$r_t^{sc} = -\left(\sum_{i=1}^{4} \|\mu_{FPB_x}^i - \mu_{FPB_x}^{i-1}\| + 6 * \sum_{i=1}^{4} \|\sigma_{FPB_x}^i - \sigma_{FPB_x}^{i-1}\|\right) \tag{8}$$

where $\mu_{FPB_x}^i$ and $\sigma_{FPB_x}^i$ are a mean value and a standard deviation of all components in the x-axis direction of the foot sole position of the $i^{th}$ leg in the elapsed time steps, respectively. The lateral coordination reward function $r_t^{lc}$ and the sagittal coordination reward function $r_t^{sc}$ work together to facilitate the robot to learn and develop coordinated and natural gaits.

A stride reward function $r_t^{fst}$ is designed to encourage the robot to increase/reduce the stride length first during velocity increasing/reducing, rather than a motion frequency, and is defined as:

$$r_t^{fst} = \frac{1}{4} \sum_{t=0}^{4} \|\sigma_{FPB_x}^i\| \tag{9}$$

A foot sole sideslipping reward function $r_t^{fsl}$ is designed to punish slipping of foot soles in a support stage, and is defined as:

$$r_t^{fsl} = -\|v_f^{support}\| \tag{10}$$

A foot sole raising reward function $r_t^{fcl}$ is designed to allow feet to move at a higher height in a swing stage, and is defined as:

$$r_t^{fcl} = -C(6.75 * (\hat{p}_{f,z} - p_{f,z}) / \|v_c\|) * \|v_f^{swing}\| \tag{11}$$

All the reward functions above work together to guide the quadruped robot to complete a learning process of autonomous gait learning and development, and finally, the reward function $r_t$ of each time step t is defined as:

$$r_t = 0.01 * (3.2 r_t^v + 2.5 r_t^o + r_t^w + k_{c,t} * (7 r_t^{lc} + r_t^{sc} + 4 r_t^{fst} + 0.4 r_t^{fs} + 0.3 r_t^{fc})) \tag{12}$$

Where $k_{c,t}$ is a course factor. The course factor is an adjusting parameter introduced by course learning and is used for describing the difficulty degree of training.

As an effective algorithm based on deep reinforcement learning, the course learning is usually introduced into training of an agent. Its core concept is that: Learning is started from a simple task or a part of a task, and then the difficulty level of the task is gradually increased, allowing the agent to finally learn the whole complex task.

On this basis, this embodiment introduces a course learning method, so that the robot can learn the main task (following the motion command and keeping the body balance) first at the beginning of the training stage, and then a constraint coefficient is gradually increased. The course factor $k_{c,t}$ describes a difficulty level during training and is defined as $k_{c,t}=(k_{c,t-1})^{kd}$, where $k_d$ represents that $k_{c,t}$ reaches an increase velocity of a maximum course difficulty level. The settings of PPO hyper-parameters are shown in Table 1.

TABLE 1

PPO Hyper-parameter Settings

| Hyper-parameter | Value |
| --- | --- |
| Batch size | 36728 (1024 × 32) |
| Mini-batch size | 9182 (1024 × 8) |
| Number of epoch | 5 |
| Clip range | 0.2 |
| Entropy efficient | 0.004 |
| Learning rate | 4e−4 |
| Discount factor | 0.998 |
| GAE discount factor | 0.996 |
| Desired KL-divergence kl* | 0.01 |

Embodiment 2

In another typical embodiment of the present disclosure, as shown in FIG. 1 to FIG. 4, a system for controlling motions of a quadruped robot based on reinforcement learning and position increment is set forth, including:
an information acquisition module, configured to: acquire motion environment information, quadruped robot attitude information, and foot sole position information;
an increment calculation module, configured to: based on the acquired information, generate foot sole positions of the quadruped robot during motions within all preset time steps, and calculate a change of the foot sole positions in all the time steps;
a trajectory planning module, configured to: take a maximum moving distance within a single time step as a constraint, and accumulate the time steps at the same time to obtain a foot sole position trajectory; and
a motion control module, configured to: control the quadruped robot to perform corresponding actions based on the foot sole position trajectory combined with a preset reward function, so as to keep motion balance of the quadruped robot.

It can be understood that, the system for controlling motions of a quadruped robot based on reinforcement learning and position increment in this embodiment is implemented based on the method for controlling motions in Embodiment 1. Therefore, the description of a working process of the system for controlling motions of a quadruped robot based on reinforcement learning and position increment may refer to Embodiment 1, and details are not described herein again.

The foregoing descriptions are merely preferred embodiments of the present disclosure, but are not intended to limit the present disclosure. A person skilled in the art may make various alterations and variations to the present disclosure. Any modification, equivalent replacement, or improvement made and the like within the spirit and principle of the present disclosure shall fall within the protection scope of the present disclosure.

What is claimed is:

1. A method for controlling motions of a quadruped robot based on reinforcement learning and position increment, comprising:
acquiring motion environment information, quadruped robot attitude information, and foot sole position information;
based on the acquired information, generating foot sole positions of the quadruped robot during motions within all preset time steps, and calculating a change of the foot sole positions in all the time steps;
taking a maximum moving distance within a single time step as a constraint, and accumulating the time steps at the same time to obtain a foot sole position trajectory;
controlling the quadruped robot to perform corresponding actions based on the foot sole position trajectory combined with a preset reward function, so as to keep motion balance of the quadruped robot;
acquiring and processing joint state historical information and leg phase information of the quadruped robot as a control input of the quadruped robot, to obtain a next action command to control the motions of the quadruped robot, wherein
a pressure sensor is not provided on each foot sole of the quadruped robot, the joint state historical information being used as an input of a reinforcement learning policy, to achieve a detection of each foot sole of the quadruped robot to ground contact, and the joint state historical information includes a joint position error and a joint velocity, the joint position error being a deviation between a current joint position and a previous joint position instruction;
outputting, by an independent policies modulating trajectory generator (PMTG) for each leg, a foot sole position of each leg of the quadruped robot in a Z-axis direction; wherein, the PMTG is defined to simulate a basic stepping gait mode by using cubic Hermite spline, and an equation is as follows:

$$F(\phi) = \begin{cases} h(-2k^3 + 3k^2) & k \in [0, 1] \\ h(2k^3 - 9k^2 + 12k - 4) & k \in [1, 2] \\ 0 & \text{otherwise} \end{cases}$$

where, $k=2(\phi-\pi)/\pi$, h is a maximum allowable foot raising height, and $\phi \in [0, 2\pi)$ TG phase $\phi \grave{o}[0,2\pi)$;
outputting a foot sole position increment and an adjusting frequency of each leg of the quadruped robot based on the reinforcement learning policy; and, a target foot sole position $(x, y, z)_t$ at a time t is obtained by the following equation:

$$(x, y, z)_t = \Delta(x, y, z)_t + (x_{t-1}, y_{t-1}, F(\phi_t)),$$

where, foot sole positions in an X-axis direction and a Y-axis direction are obtained by accumulating foot sole position increments ($\Delta x$, $\Delta y$) in the X-axis and Y-axis directions output by the reinforcement learning policy; and, a foot sole position in the Z-axis direction is obtained by superposing a foot sole position increment $\Delta z$ in the Z-axis direction output by the reinforcement learning policy and a priori value provided by the PMTG.

2. The method for controlling motions of a quadruped robot based on reinforcement learning and position increment according to claim 1, wherein the quadruped robot is provided with an inertial measurement unit and a joint motor encoder to acquire a reference linear velocity, a direction, an angular velocity, and a joint position of the quadruped robot.

3. The method for controlling motions of a quadruped robot based on reinforcement learning and position increment according to claim 1, wherein a foot sole position region is selected based on the reinforcement learning policy and this region serves as a change interval of foot sole positions so as to restrain the maximum moving distance of foot soles within a single time step.

4. The method for controlling motions of a quadruped robot based on reinforcement learning and position increment according to claim 1, wherein target foot sole positions are predefined in a basic framework of the quadruped robot and are combined with corresponding target positions to calculate target joint motor positions, and joint torques are calculated to track the target joint motor positions.

5. The method for controlling motions of a quadruped robot based on reinforcement learning and position increment according to claim 1, wherein a base linear velocity reward function and a rotation direction reward function of the quadruped robot are designed to encourage the robot to track an upper-level control instruction to give specified velocity instruction and rotation direction instruction.

6. The method for controlling motions of a quadruped robot based on reinforcement learning and position increment according to claim 1, wherein an angular velocity reward function, a lateral coordination reward function, a sagittal coordination reward function, a stride reward function, a foot sole sideslipping reward function, and a foot sole raising reward function are designed, respectively, and these reward functions work together to guide the quadruped robot to complete action execution.

\* \* \* \* \*